E. A. MILLER.
AUTOGENOUS WELDING TORCH.
APPLICATION FILED SEPT. 9, 1911.
1,091,525.
Patented Mar. 31, 1914.
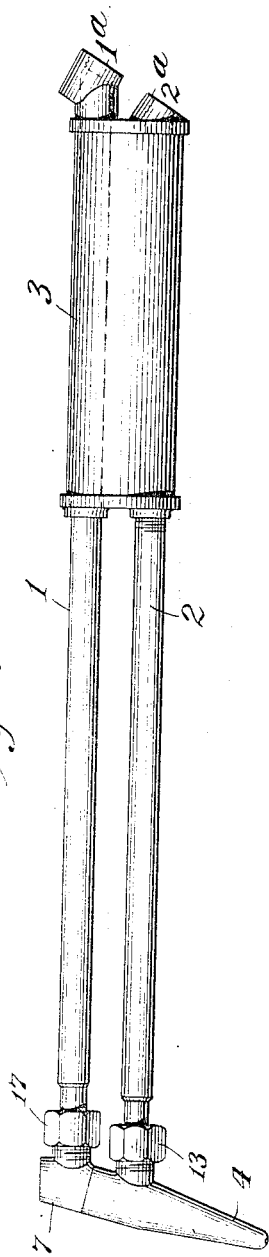
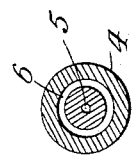
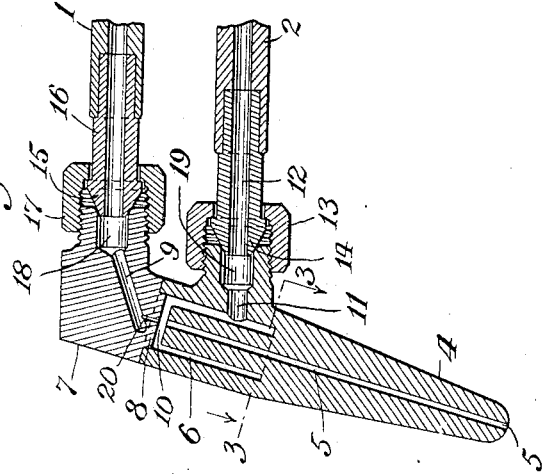

UNITED STATES PATENT OFFICE.

EDWARD A. MILLER, OF NEW YORK, N. Y.

AUTOGENOUS-WELDING TORCH.

1,091,525.     Specification of Letters Patent.     Patented Mar. 31, 1914.

Application filed September 9, 1911. Serial No. 648,510.

*To all whom it may concern:*

Be it known that I, EDWARD A. MILLER, a citizen of the United States, residing at New York, in the county of New York and State of New York, have invented certain new and useful Improvements in Autogenous-Welding Torches, of which the following is a specification, reference being had therein to the accompanying drawing.

This invention relates to an autogenous welding torch, having for its object the provision of a device for heating and welding metals by means of a mixture of gases under pressure; and the invention consists essentially in the novel means for mixing the gases and more particularly in the construction of the outlet or mouthpiece, to the end that the gases may be introduced thereinto and thoroughly mixed and presented at the point of combustion, so that the best results may be attained in the use of the torch.

The invention also comprises various details in the construction, arrangement and combination of parts, substantially as will be hereinafter described and claimed.

In the accompanying drawing, illustrating my invention; Figure 1 is a side view of my improved welding torch; Fig. 2 is an enlarged cross-section of the mouthpiece and the parts adjacent thereto; Fig. 3 is a cross-section on the line 3, 3 of Fig. 2.

Similar characters of reference designate corresponding parts throughout the different figures of the drawing.

The main frame 3 supports the two pipes 1 and 2, which are provided at their extremities 1ª and 2ª with threaded sockets for attaching to valves which in turn connect with hose leading to sources of supply. The other ends of the gas-carrying pipes 1 and 2 are connected to the mouthpiece, which consists essentially of the nose 4 and the rear section 7. These two parts are secured together tightly into a single device and they occupy a position preferably at an angle to the direction of the pipes 1 and 2.

The general form of the entire device is seen in Fig. 1. It is to be noted that pipe 1 conveys oxygen, while pipe 2 carries acetylene or other combustible gas. The acetylene or other combustible gas and the oxygen are thus introduced into the mouthpiece and therein thoroughly commingled.

The pipe 1 connects with the rear section 7 of the mouthpiece by means of a short pipe 16 having a conical end 15 which seats upon a projecting boss 18 that is screw-threaded on the outside and receives thereon a screw-threaded sleeve 17. The conical end 15 of the pipe 16 is held firmly against its seat by the sleeve 17. The other end of pipe 16 is brazed or otherwise tightly connected to the gas pipe 1. Inside of the rear section 7 of the mouthpiece is a passage 9, running from the cavity within the boss 18 to a point where a small orifice 20 passes from the channel 9 at an angle. Orifice 20 is very much restricted in size and is preferably at the center or on the axial line of the rear section 7 and furnishes an outlet through which the oxygen passes as a jet into the nose 4 of the mouthpiece. Nose 4 is an elongated part or projection which is secured to the rear section 7 by hard solder or other means. On the rear section 7 and surrounding the injector orifice 20 is a projection 8 which enters for a short distance into a cavity 10 and the end of the nose 4 is hard soldered tightly in the shoulder around the projection 8. The cavity 10 communicates with an annular passage 6 which extends part of the way through the length of the nose 4, while at the center of the nose 4 is an elongated passage 5, which runs from the passage 10 to the end of the nose 4. By referring to Fig. 2, it will be seen that the central passage 5 is directly opposite to the injector orifice 20. The acetylene pipe 2 connects with the nose 4 of the mouthpiece by means of a connection 12, which is brazed or otherwise secured thereto, and which has a conical end 14, that seats itself against a screw-threaded boss 19, the interior cavity of which boss 19 connects by a passage 11 with the annular passage 6 in the nose 4. The screw-threaded sleeve 13 engages the conical end 14 of the connection 12 and binds it firmly against its seat in the screw-threaded boss 19. Thus it will be seen that the oxygen is supplied to one part of the mouthpiece and from thence is passed by a jet orifice into the cavity in the other part of the mouthpiece. This latter cavity receives the acetylene or other combustible gas which flows around through the annular space and meets the oxygen where it passes through the injector orifice 20. Since this injector orifice 20 is opposite to the longitudinal outlet passage 5, the oxygen will become mingled with the acetylene gas in passage 5 and the mixture will be forced under pressure through the outlet passage 5, until it reaches the outer end of the nose 4 where combustion takes place.

Thus it will be seen that I provide a torch whose mouthpiece is so built that it has inlet means for the different supplies of gas, which means can be kept tight severally and independently and without any leakage, and the mouthpiece itself which consists of the nose 4 and rear section 7, is substantially made in one piece, since the hard soldering of the parts together, unites them tightly into a single device. Further, the conical joints on the passages 12 and 16 furnish tight seats and effectively prevent any leakage from occurring.

What I claim is:

A mouthpiece for metal heating and welding employing gases under different pressures, comprising a nose having a transverse cavity therein, a long annular passage communicating with said cavity, and a central longitudinal outlet passage located concentric with the annular passage and parallel thereto and communicating also with said cavity, and a rear section having an inner cavity provided with a short restricted injector orifice delivering into the aforesaid transverse cavity in the nose at a point directly opposite to the central longitudinal outlet passage and alined therewith, in combination with piping means for conveying the two gases to the nose and rear section of the mouthpiece.

In testimony whereof I affix my signature in presence of two witnesses.

EDWARD A. MILLER.

Witnesses:
JEANNETTE STORK,
L. S. PERRINE.